Figure 1:
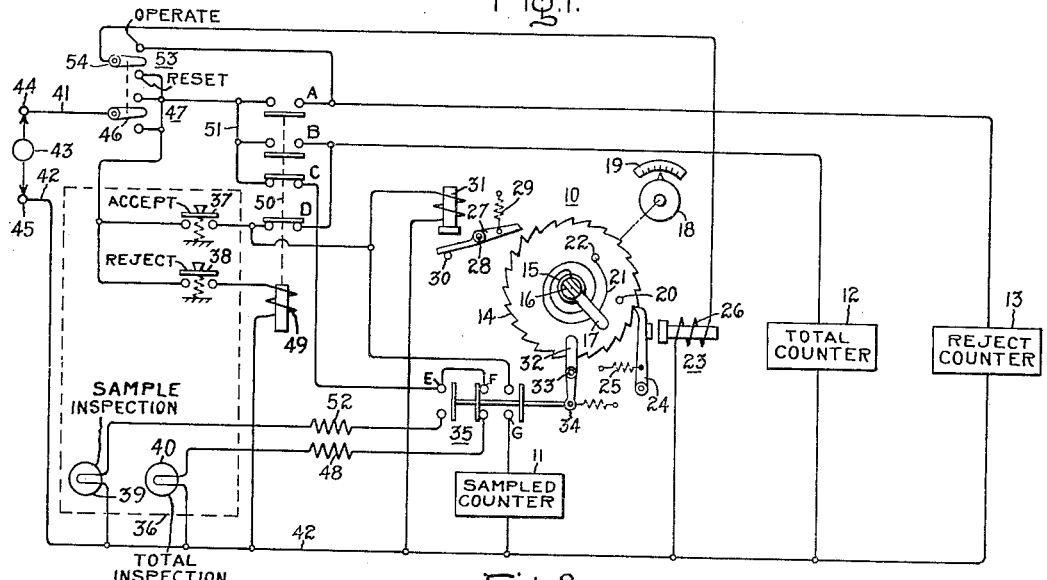

Oct. 25, 1955          R. A. HARDESTY ET AL          2,721,701
QUALITY MONITORING APPARATUS
Filed Nov. 13, 1951

Inventors:
Robert A. Hardesty,
George W. Kessler,
by Paul A. Frank
Their Attorney.

United States Patent Office 2,721,701
Patented Oct. 25, 1955

2,721,701

QUALITY MONITORING APPARATUS

Robert A. Hardesty, Albany, and George W. Kessler, Schenectady, N. Y., assignors to General Electric Company, a corporation of New York Application November 13, 1951, Serial No. 255,988

10 Claims. (Cl. 235—92)

Our invention relates to quality monitoring apparatus and has for one of its objects the provision of a monitoring device enabling the maintenance of an average outgoing quality level of product with a minimum amount of individual item inspection.

The "average outgoing quality level" of a production line may be generally defined as the percent of subquality or defective units existing in the total output of the production line. More technically the A. O. Q. L. is an average outgoing quality limit equal to that quality level which the average outgoing quality has a given probability of exceeding, which probability is by convention understood to be 0.27 percent. In the manufacture of many articles, the time and expense involved in inspecting each and every outgoing item in order to eliminate substantially all subquality units is unwarranted commercially. A small percentage of subquality units may often be tolerated and a proper procedure of partial rather than total inspection employed to insure that the tolerable percentage of defective units will not be exceeded. The partial inspection procedures available to maintain a desired average outgoing quality level are somewhat complicated, however, with the result that most manufacturing concerns utilize an unwarranted total inspection procedure or else employ an unsatisfactory or complicated sampling inspection procedure or even a completely haphazard inspection procedure.

Accordingly, another object of our invention is to provide apparatus which assists an inspector in following a proper partial inspection procedure to maintain any desired average outgoing quality level of product.

One inspection procedure which has been devised to insure a desired quality level of product is a combination of "continuous sampling inspection" and "complete sequential inspection." During "continuous sampling inspection," only a certain predetermined percentage of items produced (such as every tenth item) called the sampling ratio is inspected, while during complete sequential inspection each successively produced item is inspected. In order to insure the desired quality level, continuous sampling inspection of a predetermined percentage of produced items is maintained until a subquality item is found among those inspected, whereupon a complete sequential inspection procedure is instituted until a predetermined number, called a "clearance number," of consecutive acceptable items is found. Continuous sampling inspection is then resumed.

By removing all subquality units found during the foregoing inspection procedure, a desired outgoing quality level may be maintained with a predetermined reliability. The "sampling ratio" and "clearance number" vary, depending upon the quality level to be maintained and the desired certainty of results. Graphs of curves from which a proper clearance number and sampling ratio may be obtained have been published in an article entitled "A sampling plan for continuous production" by H. F. Dodge in the Annals of Mathematical Statistics, volume XIV, pp. 264–279, 1943, together with a discussion of the mathematics by which these curves are derived. Accordingly, a further object of our invention is to provide apparatus which enables an inspector immediately to determine at any instant of time whether to follow a continuous sampling inspection procedure or a complete sequential inspection procedure in order to maintain a desired outgoing quality level of product. As a consequence, the inspector can devote his entire attention to the actual work of inspecting; merely following the directions dictated by the apparatus of our invention.

A still further object of our invention is to provide apparatus for counting the total number of items inspected during both sampling and sequential inspection, the total number of items inspected during sampling inspection only, and the total number of inspected items found to be below acceptable quality in order that both long and short term trends in the efficiency of the production line may be observed.

In general, our invention includes a principal counting device having an adjustable total counting limit. The counting device is arranged to be energized to count the number of inspected items as long as it has not reached its total counting limit but is insensitive to further energization after the counting limit is reached. The counter is energized by an inspector whenever an inspected item is found to be acceptable. An indicating device is arranged to be actuated only when the counter reaches and resides in its counting limit condition. Resetting means are provided for the counter, and this resetting means is arranged to be energized by an inspector whenever an inspected item is found to be unacceptable regardless of whether the counter is in a counting condition or at its counting limit. The indicating device functions to direct the inspector to follow either a sampling inspection procedure or a complete sequential inspection procedure.

Three auxiliary counters which function as a total inspection counter, a sampled inspection counter, and a reject counter are also preferably included in the apparatus to enable a determination of the efficiency of the production line as well as the reliability with which the average outgoing quality level is being maintained. The "total" counter is arranged in the apparatus to be energized whenever an inspector attempts to energize the principal counter, such as when an inspected item is found acceptable; and also to be energized whenever the resetting means of the principal counter is energized by the inspector, such as when an inspected item is found unacceptable. The "sampled" counter is arranged to be energized only by signals which arrive after the principal counter has reached its counting limit condition, while the "reject" counter is arranged to be energized only upon an energization by the inspector of the resetting means of the principal counter.

The novel features which we believe to be characteristic of our invention are set forth in the appended claims. The invention itself, however, together with further objects and advantages thereof, may best be understood by reference to the following description taken in connection with the accompanying drawing in which Fig. 1 is a schematic circuit diagram of apparatus embodying our invention, and Fig. 2 is a typical family of curves by which the required clearance number and sampling ratio may be obtained for a desired average outgoing quality level of product.

Figure 2:
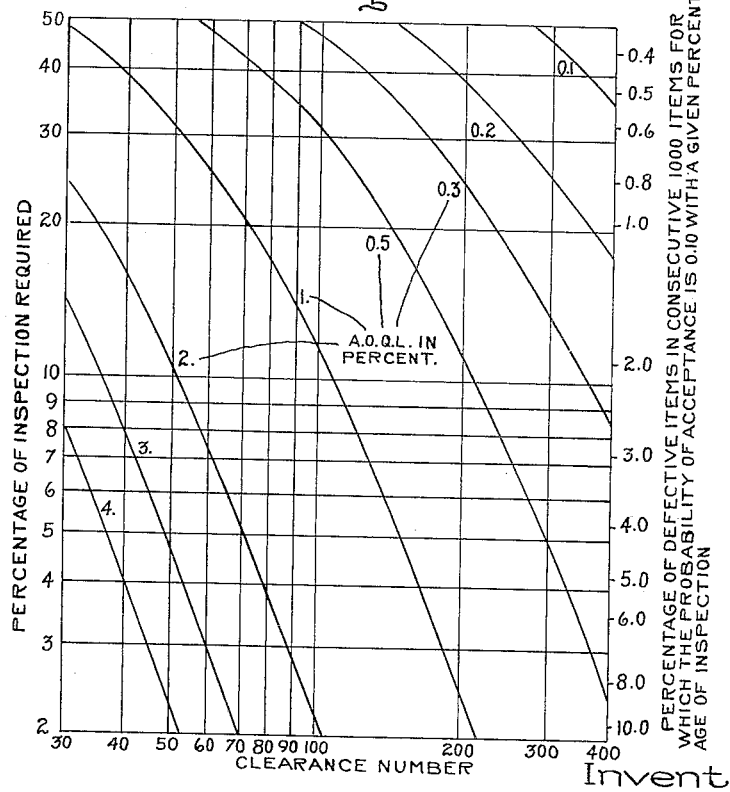

Referring to Fig. 1, we have shown our invention in one form as comprising a principal counting device or counter 10, whose components are shown in schematic diagram form, and three conventional auxiliary counters 11, 12, and 13 shown in block diagram form and labeled in accord with the function they serve in the invention.

Auxiliary counters 11, 12 and 13 may comprise any of the well-known type of counters responsive to impulses of electric energy. They are preferably of the type which provide a continuous indication of the number of electric impulses to which they have been responsive. Principal counter 10 is shown as a mechanical type counter although a corresponding completely or partially electronic counting system may alternatively be employed. Counter 10 includes a ratchet wheel 14 freely journalled by means of a bearing 15 on a central shaft 16. Shaft 16 carries a radially extending arm 17 whose angular position around its axis of rotation is adjustable by means of a dial 18 mechanically interconnected with shaft 16. The radial position of arm 17 may be determined by means of a calibrated scale 19 associated with dial 18. A stop pin 20 is secured to and projects from a side of wheel 14 in a position such as to encounter arm 17 upon a clockwise rotation of wheel 14. A spiral spring 21 is wound around shaft 16 and connected between the shaft 16 and a post 22 secured to wheel 14 in order to bias wheel 14 to move in a clockwise direction.

A ratchet type clutch 23 comprising ratchet arm 24, spring 25, and electromagnet 26 functions to restrain the clockwise movement of wheel 14 when clutch 23 is not energized. Ratchet arm 24 is maintained in engagement with the teeth of wheel 14 under the tension of spring 25 as long as no current flows through the coil of electromagnet 26. Energization of electromagnet 26, however, causes arm 24 to move out of engagement with the teeth of wheel 14 and allows wheel 14 to move in a clockwise direction under the tensional force of spring 21 until stop pin 20 encounters arms 17. Clutch 23, spring 21, pin 20, and arm 17 constitute a resetting means for counter 10 as will be more fully explained hereinafter.

Wheel 14 is incrementally advanced in a counterclockwise direction in accord with electric pulses to be counted by means of an electromagnetically driven reciprocating pawl 27 centrally pivoted on pivot pin 28 and normally held against stop pin 30 by spring 29 just out of engagement with the teeth of wheel 14. An electromagnet 31 is arranged to enforce a downward movement of the tooth-adjacent end of pawl 27 to cause wheel 14 to move one step in a counterclockwise direction in the usual manner of ratchet wheel propulsion. Ratchet arm 24 retains the wheel 14 in its advanced position when pawl 27 moves out of engagement with the teeth of wheel 14 as electromagnet 31 is de-energized.

In order to provide a counting limit for counter 10, a stop lever 32 is arranged to arrest the counterclockwise movement of stop pin 20 and thus of wheel 14 after a predetermined number of incremental rotational advances of wheel 14 resulting from consecutive electric pulses supplied to pawl actuating electromagnet 31. Stop lever 32 is journalled on a centrally located pivot pin 33 and is mechanically connected through linkage 34 to close two pairs of contacts E and G and open one pair of contacts F of a limit switch 35 upon a rightward movement of the pin-arresting end of lever 32. It is apparent that sufficient consecutive pulse energizations of electromagnet 31 cause wheel 14 and stop pin 20 to advance in a counterclockwise direction until pin 20 engages lever arm 32. Further counterclockwise advance of wheel 14 and stop pin 20 causes stop lever arm 32 to propel the contact carrying arm of switch 35 to move into what may be termed its "closed position," whereupon all further movement of stop lever 32 is prevented and no further counterclockwise advance of wheel 14 occurs despite succeeding electric pulse energizations of electromagnet 31.

It will thus be seen that the upper counting limit of counter 10 is determined by the number of intermediate counting conditions of the counter between an initial zero count condition wherein stop pin 20 rests against arm 17 and a counting limit condition wherein the further counterclockwise advance of wheel 14 is prevented by stop lever 32 in cooperation with stop pin 20. The total number of pulses which may be counted by counter 10 before the counting limit is reached may be adjusted by adjusting the rotational position of shaft 16 and the consequent radial position of arm 17 so that more or less intermediate counting conditions of the counting wheel 14 exist between its initial zero count position and its final limited position. Scale 19 can thus be calibrated to indicate directly the magnitude of this upper counting limit of counter 10.

The control panel for the quality monitoring apparatus of the invention is shown within dashed line 36 and includes two control devices, in this case switches 37 and 38 labeled "accept" and "reject" respectively, and two indicating lamps 39 and 40 labeled "sample inspection" and "total inspection" respectively. Switches 37 and 38 are preferably hand or foot operable and mounted together with lamps 39 and 40 adjacent the inspector's station.

A pair of input leads 41 and 42 are adapted to be connected to an electric power source 43 through suitable input terminals 44 and 45 respectively. Source 43 may be of alternating or direct current depending upon the type of electromagnetic relays employed in the equipment. Input lead 41 is connected to a contact arm 46 of a main power switch 47 preferably having two electrically interconnected contact positions, as shown. Accept switch 37 is connected in series with the energizing coil of electromagnet 31 and power source 43 through switch 47. Electromagnet 31 is thus energized whenever switches 37 and 47 are both in their contact-making positions. Lamp 40 is also connected in series with contacts C of a relay 50 and power source 43 through a resistor 48 and a pair of normally closed contacts F of switch 35. Sampled counter 11 is similarly arranged to be connected in series with switch 37 whenever the normally opened contacts G of limit switch 35 are closed by virtue of the movement of stop lever arm 32.

Reject switch 38 is connected in series with switch 47 to supply power to an energizing coil 49 of an electromagnetic relay 50. Relay 50 has four pairs of contacts, two of which, designated by the letters A and B, are normally maintained open, while two of which, designated by the letters C and D, are normally maintained closed when coil 49 is not energized. Energization of coil 49 causes contacts A and B to close and contacts C and D to be opened. Three of the contact pairs A, B, and C of relay 50 are connected to receive power at one contact thereof through switch 47. Reject counter 13 is connected between input lead 42 and contacts A of relay 50 while total counter 12 is similarly connected between lead 42 and contacts B of relay 50. Indicating lamp 39 is connected between input lead 42 and normally closed contacts C of relay 50 through a voltage dropping resistor 52 and normally open contacts E of limit switch 35. Total counter 12 is also connected in series with "accept" switch 37 through normally closed contacts D of relay 50.

A "reset-operate" switch 53 is preferably included in the apparatus and has its contact arm 54 connected to one end of energizing coil 26 of clutch 23, the other end of coil 26 being connected to input lead 42. The contact arm 54 of switch 53 is preferably mechanically ganged together with contact arm 46 of main power switch 47. When in the "reset" position, coil 26 of clutch 23 is connected to receive energizing power from lead 41 through switch 47; while in the "operate" position, coil 26 is also connected in series with the normally open contacts A of relay 50.

Referring now to Fig. 2, there is shown a typical family of curves by which proper clearance numbers and sampling ratios may be obtained to maintain various desired average outgoing quality levels of product. Similar curves for other desired average outgoing quality levels can be found or derived in accord with the methods outlined in the aforementioned Dodge publication. Presuming a desired quality level of 0.3%, the appropriate curve shows that a clearance number of 400 requires a continuous sampling inspection percentage of approximately 8.6%, a sampling ratio of about one out of every twelve items. A clearance number of 300, however, requires a continuous sampling inspection percentage of approximately 14% for the same 0.3% quality level while a clearance number of 200 requires an inspection percentage of 25% so that one out of every four items would need to be sampled during the continuous sampling interval. The reliability by which the desired quality level may be guaranteed increases as the inspection percentage employed during the continuous sampling inspection interval approaches 100%. By using a higher clearance number and a lower sampling ratio, however, considerable inspection time may be saved and the probability of deviation from the desired quality level will still usually be a negligible value.

In the operation of the apparatus in Fig. 1, a clearance number is first obtained from curves such as shown in Fig. 2 and the required sampling ratio determined. Shaft 16 and radially extending arm 17 are then rotated by adjustment of dial 18 as indicated on calibrated scale 19 to set counter 10 to have an upper counting limit equal to the desired clearance number. Switch 53 is then thrown into its "reset" position causing switch 47, ganged thereto, to be thrown into one of its power supplying positions. Coil 26 of electromagnetic clutch 23 is thus connected in series with the power supplying input leads 41 and 42 and clutch 23 is energized. Ratchet arm 24 is moved out of engagement with ratchet wheel 14 and counter 10 is reset into its initial zero count condition by the rotation of wheel 14 under the tensional force of spiral spring 21. None of the auxiliary counters 11, 12 or 13 are energized by this initial resetting action. Switch 54 is then moved into its operating position carrying main power switch 47 into the second of its power supplying positions. In this "operate" position of switch 54, coil 26 of clutch 23 is connected in series with the normally open contacts A of relay 50 and is thus deenergized. Ratchet arm 24 is consequently allowed to move into engagement with the teeth of wheel 14 under the influence of spring 25.

When the counter 10 is in this initial zero count condition, lamp 40 is lit since current is supplied thereto through switch 47, normally closed contact C of relay 50, and normally closed contacts F of limit switch 35. This indicates to the inspector that a complete sequential inspection procedure, i. e., "total inspection" should be followed. The inspector then begins to inspect each and every item as it comes off the production line, closing accept switch 37 or reject switch 38 in accord with the quality of the item inspected. Whenever accept switch 37 is closed, a pulse of electric energy is supplied to energize electromagnet 31 of counter 10, and an energizing pulse is also supplied to total counter 12 through normally closed contacts D of relay 50. The closing of accept switch 37 thus tends to advance counting wheel 14 incrementally in accord with the number of inspected items found to be acceptable, and the total number of accepted items is recorded by total counter 12.

Whenever reject switch 38 is closed, coil 49 of relay 50 is energized to close normally open contacts A and B and to open normally closed contacts C and D thereof. When contacts A of relay 50 close, a pulse of electrical current is supplied through switch 53 to energize coil 26 of clutch 23 and is also supplied to energize reject counter 13. The energization of clutch 23 operates in the manner described above to reset counter 10 to its zero count condition. The closing of contacts B of relay 50 in response to the closing of reject switch 38 functions to supply a pulse of current to energize the total counter 12 so that both reject counter 13 and total counter 12 are energized whenever switch 38 is closed. It will thus be appreciated that during this total inspection period, throughout which lamp 40 is lit, counter 10 tends to advance toward its counting limit position whenever accept switch 37 is closed and is reset back to its initial zero count condition whenever reject switch 38 is closed. A number of consecutive acceptable units equal to the predetermined counting limit of principal counter 10 must, therefore, occur before counter 10 will attain its counting limit condition. Moreover, if the power supplied from source 43 should accidentally fail or be removed, ratchet arm 24 will remain engaged in the teeth of ratchet wheel 14 since clutch 23 will remain de-energized. Consequently, the preceding accumulated count will be "remembered" when power is again supplied to the apparatus.

When principal counter 10 moves into its counting limit position in response to a final consecutive closing of accept switch 37 equal to the clearance number, lever arm 32 is propelled under the force of stop pin 20 to cause limit switch 35 to move into its "closed" position in which normally open contacts E and G are closed and normally closed contacts F are opened. The opening of contacts F of switch 35 cuts off the power supplied to lamp 40 which is thus extinguished while the closing of contacts E of switch 35 completes the circuit to lamp 39 through the normally closed contacts C of relay 50, and lamp 39 is lit. The closing of contacts G of limit switch 35 places the sampled counter 11 in conductive circuit relation with accept switch 37. The lighting of lamp 39 and the turning-off of lamp 40 indicate to an inspector that complete sequential inspection may now be discontinued and a continuous sampling inspection procedure invoked in accord with the predetermined sampling ratio derived from the curves of Fig. 2. The inspector then follows a sampling inspection procedure of this predetermined percentage of produced items, continuing to close accept switch 37 whenever an inspected item is found acceptable and to close reject switch 38 whenever an inspected item is found to be below acceptable quality. The closing of accept switch 37 continues to send electric pulses to sampled counter 10 and through counting electromagnet 31 but counting wheel 14 is prevented from further counterclockwise rotation by stop lever 32 with the result that no further count is remembered by counter 10. Total counter 12, however, still receives an energizing pulse through the normally closed contacts D of relay 50 whenever accept switch 37 is closed. If a defective item is found during this continuous sampling inspection period and reject switch 38 closed, coil 49 of relay 50 is energized in the same manner as described above in connection with the total inspection interval and resetting clutch 23 energized by the closing of contacts A of relay 50. The movement of counting wheel 14, upon energization of clutch 23, operates to release stop lever 32 and open limit switch 35, thus opening contacts E, closing contacts F and opening contacts G. The movement of switch 35 into its "open" position re-lights lamp 40 and extinguishes lamp 39, thus indicating to an inspector that a complete sequential inspection procedure, should again be followed.

It will thus be seen that with the above-described apparatus, once counter 10 is adjusted to have a proper upper counting limit in accord with a predetermined clearance number, an inspector need only close accept switch 37 or reject switch 38 in accord with the quality of the items inspected and follow the inspection procedures dictated by lamps 39 and 40. In addition, the apparatus functions to keep a continuing count of the total number of units inspected by virtue of the connections to total counter 12; to keep a continuing count of the number of units rejected by virtue of the connections to the reject counter 13; and to record the number of acceptable units during the continuous sampling inspection period by virtue of the connections to sampled counter 11.

Although we have described above a preferred embodiment of our invention, many modifications can of course be made. A completely electronic counting system may, for example, be substituted for mechanical counter 10 described above. Other known types of mechanical counters having adjustable counting limits may also be substituted. Moreover, it is not essential that two indicating lamps 39 and 40 be employed since either lamp alone may provide the proper indication to an inspector by its illuminated or extinguished condition. Furthermore, other indicating devices may be substituted for lamps 39 and 40. It is to be understood, however, that we intend by the appended claims to cover all such modifications as fall within the true spirit and scope of our invention.

What I claim as new and desire to secure by Letters Patent of the United States is:

1. Quality monitoring apparatus comprising a counter having a zero count condition of operation and an adjustable total count limit condition of operation, means responsive to electric pulses for incrementally advancing said counter from said zero condition toward said limit condition, electric pulse responsive means for resetting said counter to its zero count condition, an electric relay having one pair of normally closed contacts and one pair of normally open contacts which reverse their contact condition when said relay is energized, first electric circuit means including said counter advancing means and a first switch for energizing said counter advancing means when said first switch is closed, second electric circuit means including said resetting means, said relay and a second switch for energizing said relay and said resetting means when said second switch is closed, and a second electric pulse counter connected in parallel with said counter advancing means through said normally closed contacts and in parallel with said resetting means through said normally open contacts.

2. Quality monitoring apparatus comprising a counter having a zero count condition of operation and an adjustable total count limit condition of operation, means responsive to electric pulses for incrementally advancing said counter from said zero condition toward said limit condition, electric pulse responsive means for resetting said counter to its zero condition, a pair of conductors for connection to a voltage source, an electric relay having one pair of normally closed contacts and two pairs of normally open contacts which reverse their contact condition when said relay is energized, a first electric circuit connected between said conductors including said counter advancing means and a first switch, second electric circuit means connected between said conductors including said relay and a second switch, third electric circuit means connected between said conductors including said resetting means and one pair of normally open relay contacts, and a second electric pulse counter connected in parallel with said resetting means through the other pair of normally open relay contacts and in parallel with said counter advancing means through said normally closed relay contacts.

3. Quality monitoring apparatus comprising a counter having a zero count condition of operation and an adjustable total count limit condition of operation, means responsive to electric pulses for incrementally advancing said counter from said zero condition toward said limit condition, said counter being insensitive to electric pulses supplied to said advancing means when in said limit condition, electric pulse responsive means for resetting said counter to its zero count condition, first and second switches arranged to be closed by the movement of said counter into its limit condition, an electric relay arranged to close a third switch when said relay is energized, a pair of conductors for connection to a voltage source, a first electric circuit connected between said conductors including an electric indicating device and said first switch, a second electric circuit connected between said conductors including a second electric pulse counter and said second switch, a third electric circuit connected between said conductors including said resetting means and said third switch, a third electric pulse counter connected in parallel with said resetting means, a fourth electric circuit connected between said conductors including said relay and a fourth switch, and a fifth electric circuit connected between said conductors including said counter advancing means and a fifth switch.

4. In apparatus for use in quality inspection at production lines, the combination of an accept switch and a reject switch, each corresponding to a respective quality of items in said production line, coacting means for counting the operations of said accept switch, means to operate said counting means to zero count condition in response to operation of said reject switch, signal means responsive to a predetermined count stored in said counting means, whereby a count is stored in said counting means for each accepted item, and said counting means is restored to zero count condition for each rejected item, and whereby said signal means is operated only upon acceptance in succession of a predetermined number of items in said production line, and means operative when said counting means is operated to a predetermined count condition to retain said counting means in said predetermined count condition during subsequent operation of said accept switch and until subsequent operation of said reject switch when said counter is restored to zero count condition.

5. In apparatus for use in quality inspection at production lines, the combination of an accept switch and a reject switch, each corresponding to a respective quality of items in said line, a first counter for counting the operations of said accept switch, a reset switch, means responsive to operation of either said reject switch or said reset switch to restore said first counter to zero count condition, a second counter, means responsive to operation of said first counter to a predetermined count condition to restrain it in that condition and to connect said second counter to said accept switch, and a third counter for counting all operations of both said accept and reject switches.

6. In apparatus for use in quality inspection at production lines, the combination of an accept switch and a reject switch, each corresponding to a respective quality of items in said line, a first counter, a total counter and a reject counter, each of said counters having actuating means, operating circuits for the actuating means of said first two counters including said accept switch whereby both counters count actuations of said accept switch, and means responsive to operation of said reject switch to restore the first counter to its zero count condition and to activate said total counter and said reject counter whereby the total of items inspected is determined from said total counter, the rejected items are counted by said reject counter, and the number of accepted items in any sequence before a rejected item is counted by said first counter.

7. In apparatus for use in quality inspection at production lines, the combination of an accept switch and a reject switch, each corresponding to a respective quality of items in said line, a first counter, a total counter and a reject counter, each of said counters having actuating means, operating circuits for the actuating means of said first two counters including said accept switch whereby both counters count actuations of said accept switch, means responsive to operation of said reject switch to restore the first counter to its zero count condition and to activate said total counter and said reject counter whereby the total of items inspected is determined from said total counter, the rejected items are counted by said reject counter, and the number of accepted items in any sequence before a rejected item is counted by said first counter, means to limit operation of said first counter to a predetermined count, and means to count the actuations of said accept switch while said first counter is in said predetermined count condition.

8. The combination, in apparatus for use in quality inspection at production lines, of a first control device to be actuated in accord with accepted items in said line, a second control device to be actuated in accord with rejected items in said line, a first counter, means to actuate said first counter in response to each actuation of said first control device, a second counter, means to actuate said second counter in response to each actuation of said first control device after said first counter has been operated to a predetermined count condition, and means responsive to said second control device to restore said first counter to zero count condition and to disconnect said second counter from said first control device.

9. The combination, in apparatus for use in quality inspection at production lines, of a first control device to be actuated in accord with accepted items in said line, a second control device to be actuated in accord with rejected items in said line, a first counter, means to actuate said first counter in response to each actuation of said first control device, a second counter, means to actuate said second counter in response to each actuation of said first control device after said first counter has been operated to a predetermined count condition, means responsive to said second control device to restore said first counter to zero count condition and to disconnect said second counter from said first control device, and means to count the total of operations of both of said control devices.

10. The combination, in apparatus for use in quality inspection at production lines, of a first control device to be actuated in accord with accepted items in said line, a second control device to be actuated in accord with rejected items in said line, a first counter, means to actuate said first counter in response to each actuation of said first control device, a second counter, means to actuate said second counter in response to each actuation of said first control device after said first counter has been operated to a predetermined count condition, means responsive to said second control device to restore said first counter to zero count condition and to disconnect said second counter from said first control device, and signal means controlled by said first counter to indicate when said first counter has attained its predetermined count condition.

References Cited in the file of this patent

UNITED STATES PATENTS

| | | |
|---|---|---|
| 2,203,717 | Thompson | June 11, 1940 |
| 2,295,968 | Poole | Sept. 15, 1942 |
| 2,312,342 | Lang | Mar. 2, 1943 |
| 2,346,869 | Poole | Apr. 18, 1944 |
| 2,351,405 | Cooper | June 13, 1944 |
| 2,428,080 | Horn | Sept. 30, 1947 |
| 2,488,754 | Willson | Nov. 22, 1949 |
| 2,530,351 | Fales | Nov. 14, 1950 |
| 2,531,448 | Lingenfelder | Nov. 28, 1950 |
| 2,556,374 | Koechel | June 12, 1951 |